United States Patent
Ghai et al.

(10) Patent No.: US 7,168,621 B2
(45) Date of Patent: Jan. 30, 2007

(54) SECTION BASED ALGORITHM FOR IMAGE ENHANCEMENT

(75) Inventors: Rashmi Ghai, New York, NY (US); Didier Frantz, New York, NY (US)

(73) Assignee: Scanbury, Inc., New York, NY (US)

( * ) Notice: Subject to any disclaimer, the term of this patent is extended or adjusted under 35 U.S.C. 154(b) by 0 days.

(21) Appl. No.: 10/833,017

(22) Filed: Apr. 28, 2004

(65) Prior Publication Data

US 2005/0121521 A1   Jun. 9, 2005

Related U.S. Application Data

(60) Provisional application No. 60/526,604, filed on Dec. 4, 2003.

(51) Int. Cl.
*G02B 26/10* (2006.01)
(52) U.S. Cl. .................. 235/462.25; 235/462.24; 235/462.01; 235/462.1
(58) Field of Classification Search ........... 235/462.25, 235/462.01, 462.06, 462.24, 462.1, 494, 235/487; 382/176, 284, 534
See application file for complete search history.

(56) References Cited

U.S. PATENT DOCUMENTS

| | | | |
|---|---|---|---|
| 4,238,768 A | 12/1980 | Mitsuya et al. | |
| 4,323,973 A | 4/1982 | Greenfield | |
| 4,554,593 A | 11/1985 | Fox et al. | |
| 4,774,569 A | 9/1988 | Morton et al. | |
| 4,969,202 A * | 11/1990 | Groezinger | 382/199 |
| 5,016,118 A | 5/1991 | Nannichi | |
| 5,113,454 A | 5/1992 | Marcantonio et al. | |
| 5,179,599 A | 1/1993 | Formanek | |
| 5,243,443 A | 9/1993 | Eschbach | |
| 5,243,444 A | 9/1993 | Fan | |
| 5,276,315 A | 1/1994 | Surka | |
| 5,327,240 A | 7/1994 | Golston et al. | |
| 5,331,442 A | 7/1994 | Sorimachi | |
| 5,345,317 A | 9/1994 | Katsuno et al. | |
| 5,510,604 A | 4/1996 | England | |
| 5,767,978 A | 6/1998 | Revankar et al. | |
| 5,778,092 A * | 7/1998 | MacLeod et al. | 382/176 |
| 5,852,677 A * | 12/1998 | Nakamura et al. | 382/173 |
| 5,877,486 A | 3/1999 | Maltsev et al. | |
| 5,890,021 A | 3/1999 | Onoda | |
| 5,909,505 A | 6/1999 | Katayama et al. | |
| 5,915,039 A | 6/1999 | Lorie et al. | |
| 5,963,669 A | 10/1999 | Wesolkowski et al. | |
| 5,969,325 A | 10/1999 | Hecht et al. | |

(Continued)

OTHER PUBLICATIONS

Trier, O.D., Jain, A.K., "Goal-Directed Evaluation of Binarization Methods," Pattern Analysis And Machine Intelligence, IEEE Transactions On, Dec. 1995, ISSN: 0162-8828.

*Primary Examiner*—Steven S. Paik

(57) ABSTRACT

This present invention discloses a system and method for enhancing images of barcodes and other similar objects taken by the digital camera connected to or embedded in a mobile device. This filter works by converting the image into its equivalent gray scale. The algorithm then divides the image into sections and finds the pixels of minimum intensity in each section of the image. This minima is used to calculate cut-off values for thresholding. After thresholding, the image is reassembled from its divided sections.

2 Claims, 3 Drawing Sheets

U.S. PATENT DOCUMENTS

| | | |
|---|---|---|
| 6,045,515 A | 4/2000 | Lawton |
| 6,091,511 A * | 7/2000 | Ben Dror et al. ............ 358/1.9 |
| 6,101,285 A | 8/2000 | Fan |
| 6,115,488 A | 9/2000 | Rogers et al. |
| 6,137,898 A | 10/2000 | Broussard et al. |
| 6,201,612 B1 | 3/2001 | Matsushiro et al. |
| 6,282,307 B1 | 8/2001 | Armato et al. |
| 6,347,156 B1 | 2/2002 | Kamada et al. |
| 6,366,696 B1 * | 4/2002 | Hertz et al. ................. 382/183 |
| 6,650,766 B1 | 11/2003 | Rogers et al. |
| 6,735,341 B1 | 5/2004 | Horie et al. |
| 6,735,745 B2 * | 5/2004 | Sarig ............................ 716/4 |
| 6,898,329 B1 | 5/2005 | Takahashi |
| 2002/0090107 A1 | 7/2002 | Acharya et al. |
| 2003/0007696 A1 | 1/2003 | Saito |
| 2003/0123710 A1 | 7/2003 | Nazakawa et al. |
| 2004/0042670 A1 | 3/2004 | Moroo et al. |
| 2004/0101183 A1 | 5/2004 | Mullick et al. |
| 2004/0240737 A1 | 12/2004 | Lim et al. |

\* cited by examiner

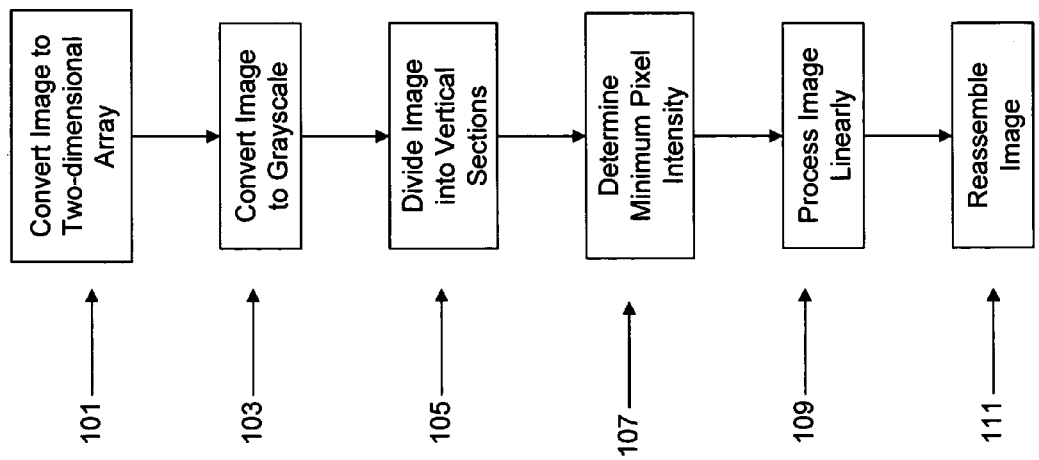

SECTION BASED ALGORITHM FOR IMAGE ENHANCEMENT

PARENT CASE TEXT

This application claims the benefit of provisional application No. 60/526,604 filed Dec. 4, 2003.

FIELD OF THE INVENTION

The present invention relates generally to the field of image enhancement algorithms. More specifically, the present invention utilizes a proprietary algorithm designed to enhance image of barcodes and other similar objects.

BACKGROUND OF THE INVENTION

Barcodes have been utilized for identifying and pricing objects for more than thirty years. Most typically, barcodes are used in retail to identify the item of merchandise. For example, a gallon of milk may contain a barcode that, when scanned, will notify the cashier of the price of the milk.

Yet in recent years, barcodes have acquired new purposes as computers and barcode scanners have become more portable. The circuitry required to scan a conventional one-dimensional barcode can now be housed in a device as small as a typical keychain. As a result, many mobile telephones, personal digital assistants ("PDAs"), and pagers can be retrofitted with or connected to a laser-based scanning device. This allows the mobile device to function as a scanner capable of storing hundreds or thousands of scanned barcodes.

Currently, many cell phones and mobile devices are available with built-in cameras. The explosion of the availability of affordable digital cameras and their inclusion into mobile devices is driven by several factors. One of the most important is the recent availability of inexpensive image sensors based on CMOS technology. The cameras on these devices provide a means for capturing the barcode information which was previously only accessible via a laser-based scanner. Decoding barcode images from digital cameras included in mobile devices presents several difficult problems. These problems go well beyond the challenges addressed in commercial barcode readers. Some of these problems are addressed below:

Lighting:

Most mobile devices with integrated digital cameras do not have built-in flashes and rely solely on the ambient light for illumination. This can cause the image to be underexposed or overexposed depending upon the intensity of the ambient light.

Focus:

Digital cameras for portable devices are usually designed to work at a variety of distances. The need for a wider range of focus in cameras results in a trade off between the cost of the lens component and the sharpness of a typical image.

Low-Cost Lens Components:

In order to meet cost constraints of many portable device markets, manufacturers often compromise on the optical quality of camera lenses. This can present decoding technology with a different set of challenges from the simple focal length based focus problem noted above. Low-cost lens components can produce image distortions that are localized to a specific region or form a changing gradient across the image.

Limited Resolution:

The cost of a digital imaging CMOS sensor increases as the number of image pixels increases. Although the Asian market has seen the release of general purpose consumer devices like PDAs and cell phones with "megapixel" image resolution, the European and North American markets are now only seeing their emergence. Lower resolution images contain less detail and usually require further processing to be useful.

Based on the aforementioned described problems with mobile digital imaging, there clearly exists a need for an image enhancement algorithm which can compensate for many of these shortcomings. Such an algorithm would allow many more of the images captured by a digital camera to be useful, especially if the images are intended for optical decoding.

SUMMARY OF THE INVENTION

The present invention provides an algorithm designed to enhance images of barcodes and other similar objects. First, the sharpening algorithm converts the gray-scale barcode image is broken down into a two-dimensional array. Each entry in the two-dimensional array stores the intensity of a single pixel. The image is then divided into an equal number of vertical sections. The number of sections ("ns") is equal to the width of the image (in pixels) divided by the desired width of the sections ("ws"). The width of the sections can either be user defined or automatically defined depending upon the size of the image. This converts the image to a three-dimensional array since each pixel also has an assigned section.

After the image has been divided into sections, the sharpening algorithm determines the minimum intensity of a pixel in each section. The image is then processed linearly section by section. This is done by assigning a pixel intensity of "black" to all pixel intensities which are below a threshold black level. The threshold black level is user-defined and may be changed for each image or section being processed. In contrast, all pixel intensities having a pixel value above a threshold white value are assigned a pixel intensity corresponding to "white."

A pixel is also assigned a "black" intensity if:
1. The value of the pixel lies within a predetermined range of the minimum pixel intensity for that section; or
2. The intensity of pixels surrounding a certain pixel has an intensity that lies within the predetermined range of minimum pixel intensity for that section.

After the image of the barcode has been processed, the sharpening algorithm renders the processed image sections back into an image.

Therefore, it is an object of the present invention to provide an image enhancement algorithm capable of sharpening a barcode image for optical decoding.

An additional object of the present invention is to provide an image enhancement algorithm which applies a distinct thresholding to each section of the image.

Another object of the present invention is to provide an image enhancement algorithm which utilizes the minimum intensity pixel of each section to determine the cut-off value for thresholding.

It is also an object of the present invention to provide an image enhancement algorithm which converts the image to grayscale prior to processing.

These and other objects of the present will be made clearer with reference to the following detailed description and accompanying drawings.

BRIEF DESCRIPTION OF THE DRAWINGS

FIG. 1 depicts a flowchart showing the process utilized by the ScanZoom software to sharpen an image.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

With reference first to FIG. 1, shown is a flowchart depicting the steps of the image enhancement algorithm of the present invention. The image enhancement algorithm has been shown to be particularly effective for sharpening images containing barcodes. First, the sharpening algorithm converts the barcode image into a two-dimensional array in step 101. Each entry in the two-dimensional array stores the intensity of a single pixel. The image can now be described as a function as follows:

$$\text{Image} = \sum_{x=0}^{n-1} \sum_{y=0}^{m-1} f(x, y)$$

where n is the image width and m is the image height. The image is then converted to a grayscale image in step 103 by mapping each pixel to its grayscale representative. In the preferred embodiment, this is done utilizing a standard color to grayscale filter.

The image is then divided into an equal number of vertical sections in step 105. The image can then be represented as follows:

$$\text{Image}_{(section)} = \sum^{ns} \sum^{ws} \sum^{m-1} f(x, y)$$
$$\{\text{where } y = m|m \geq 0\}$$
$$n = 0 \quad x = 0 \quad y = 0$$

where ns is the number of sections and ws is the desired width of the sections. The number of sections ("ns") is equal to the width of the image (in pixels) divided by the desired width of the sections ("ws"). The width of the sections can either be user defined or automatically defined depending upon the size of the image. This converts the image to a three-dimensional array since each pixel also has an assigned section.

After the image has been divided into sections, the sharpening algorithm determines the minimum intensity of a pixel in each section in step 107. The image is then processed linearly section by section in step 109. This is done by assigning a pixel intensity of "black" to all pixel intensities which are below a threshold black level. The threshold black level is user-defined and may be changed for each image or section being processed. In contrast, all pixel intensities having a pixel value above a threshold white value are assigned a pixel intensity corresponding to "white."

A pixel is also assigned a "black" intensity if:

The value of the pixel lies within a predetermined range of the minimum pixel intensity for that section; or The intensity of pixels surrounding a certain pixel has an intensity that lies within the predetermined range of minimum pixel intensity for that section.

Figure 2A:
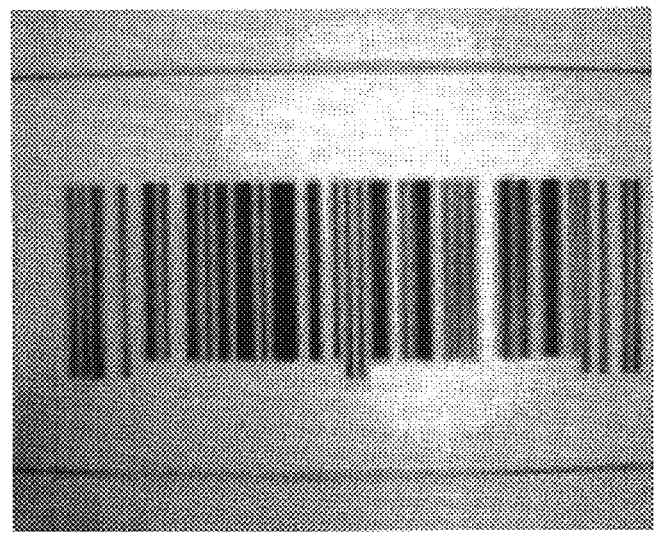
FIG. 2A depicts a typical barcode image acquired using a digital camera.
Figure 2B:
FIG. 2B depicts the barcode of FIG. 5B after it has undergone sharpening utilizing the sharpening filter depicted in FIG. 2A.

After the image of the barcode has been processed in step 109, the sharpening algorithm renders the processed image sections back into an image in step 111. An example input and output barcode which have been processed by the aforementioned sharpening algorithm are shown in FIG. 2A and FIG. 2B, respectively. The outputted image of FIG. 2B has a much higher chance of being properly decoded than the inputted image of FIG. 2A.

While the foregoing embodiments of the invention have been set forth in considerable detail for the purposes of making a complete disclosure, it should be evident to one skilled in the art that multiple changes may be made to the aforementioned description without departing from the spirit of the invention.

We claim:

1. A method of enhancing an image comprising the steps of:

converting the image to a two-dimensional array;

converting said image to grayscale;

dividing said image into vertical sections of fixed width;

assigning all pixels in said image having an intensity below a first threshold an intensity corresponding to black;

assigning all pixels in said image having an intensity above a second threshold an intensity corresponding to white, wherein said second threshold is greater than said first threshold;

determining the minimum pixel intensity in each of said sections;

assigning a pixel in a section an intensity corresponding to black if the intensity of said pixel lies within a predetermined range of the minimum pixel intensity for that section; and assigning a pixel in a section an intensity corresponding to black if the average intensity of pixels surrounding said pixel lie within a second predetermined range of minimum pixel intensity for said section, wherein said average intensity is calculated by averaging the intensity values of all pixels which are in direct contact with said pixel; and recombining said image sections to reform said image.

2. A method for enhancing an image according to claim 1, wherein said sections are further divided into an equal number of horizontal sections.

* * * * *

UNITED STATES PATENT AND TRADEMARK OFFICE
CERTIFICATE OF CORRECTION

| | | |
|---|---|---|
| PATENT NO. | : 7,168,621 B2 | |
| APPLICATION NO. | : 10/833017 | |
| DATED | : January 30, 2007 | |
| INVENTOR(S) | : Rashmi Ghai and Didier Frantz | |

It is certified that error appears in the above-identified patent and that said Letters Patent is hereby corrected as shown below:

ON THE TITLE PAGE: item 73

Please change the name of the Assignee to the following:

-- Scanbuy, Inc. (New York, NY) --

Signed and Sealed this

Eighteenth Day of December, 2007

JON W. DUDAS
*Director of the United States Patent and Trademark Office*